United States Patent Office 3,509,724
Patented May 5, 1970

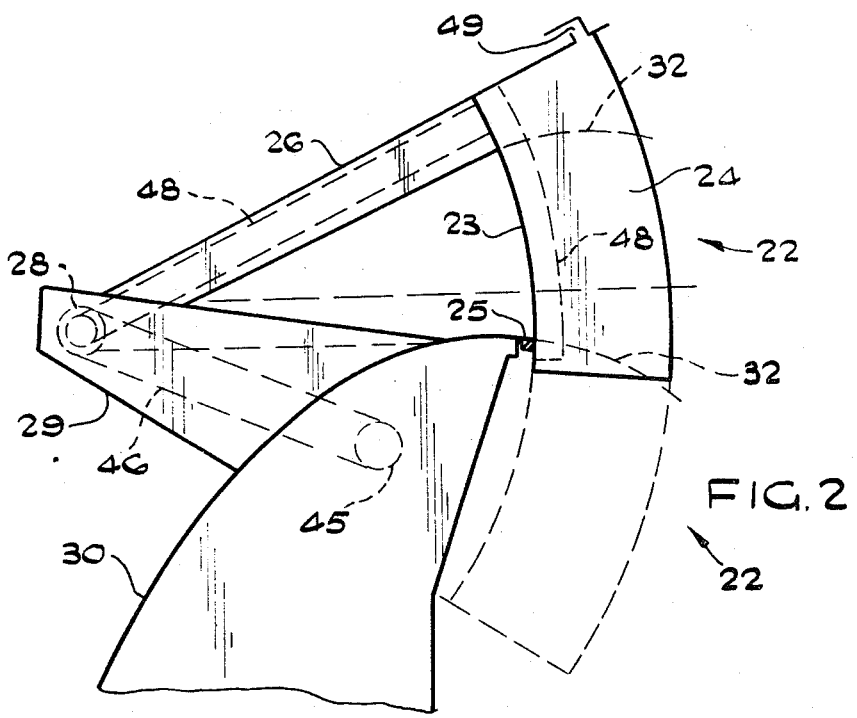
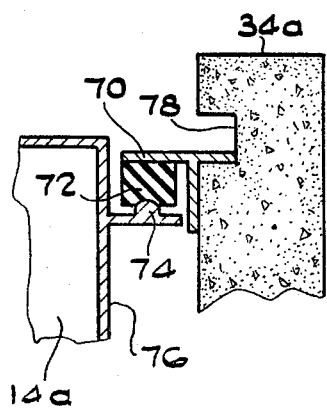

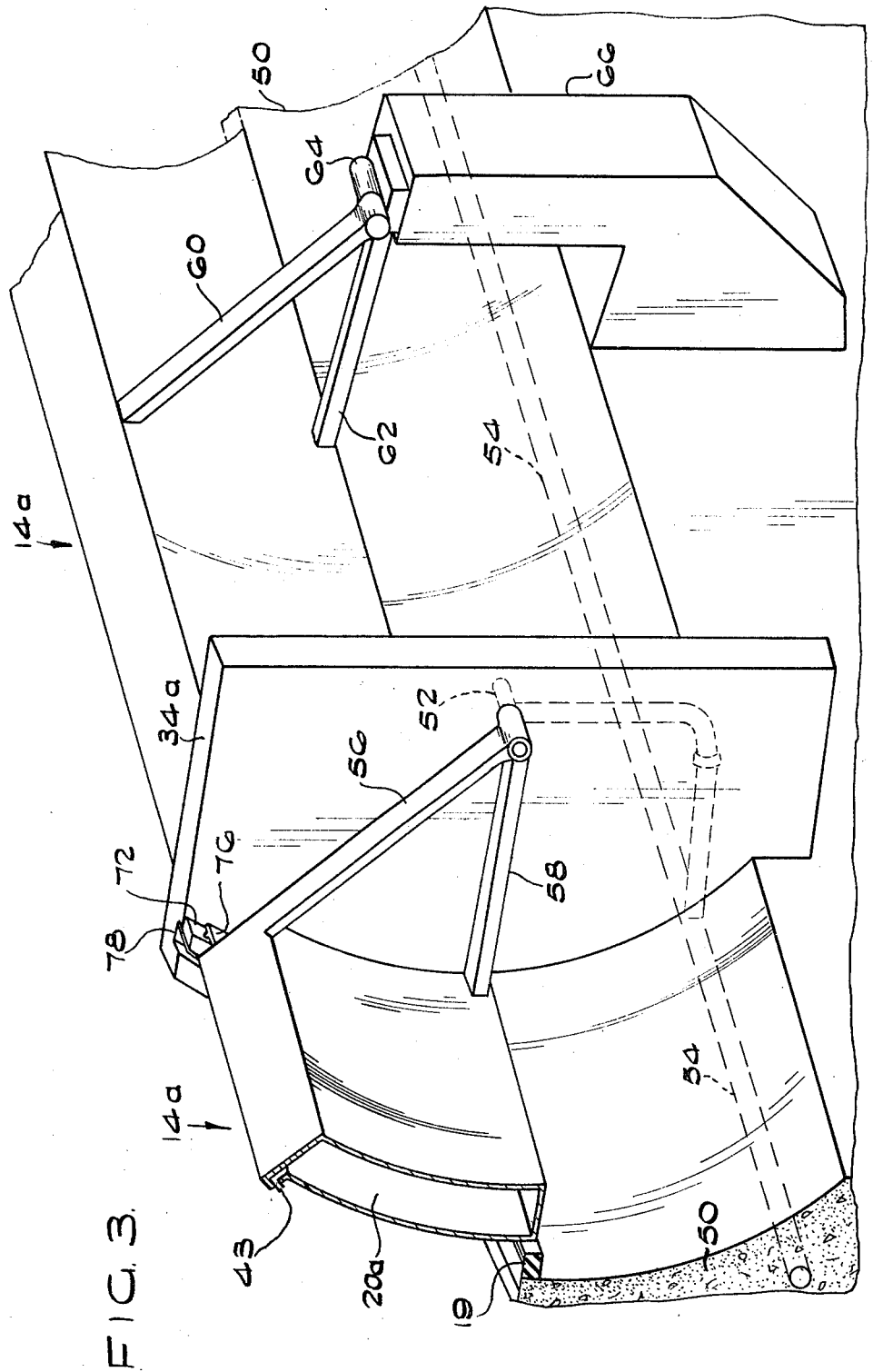

3,509,724
GATE VALVE MEANS FOR CONTROLLING THE FLOW OF WATER OVER A WEIR, DAM WALL OR THE LIKE
Lawrence Alexander Turner, Middleton, Cape Province, Republic of South Africa, assignor to Fluid Dynamics (Proprietary) Limited, Middleton, Cape Province, Republic of South Africa
Filed Nov. 6, 1967, Ser. No. 680,905
Claims priority, application Republic of South Africa, Nov. 14, 1966, 66/6,870
Int. Cl. E02b 7/50
U.S. Cl. 61—25    2 Claims

ABSTRACT OF THE DISCLOSURE

The invention provides means for varying the water storage capacity of dams, reservoirs, weirs and the like. To achieve this end, gate valve means of variable buoyancy are pivotally mounted adjacent to the crest of the impounding wall of such bodies of impounded water and are arranged to be floatably supported in the impounded body of water. Control apparatus is provided to vary the buoyancy of the gate valve means by admitting water to or withdrawing it from one or more buoyancy chambers provided in the gate valve means, whereby the effective height of the impounding wall can be varied.

---

Figure 1:
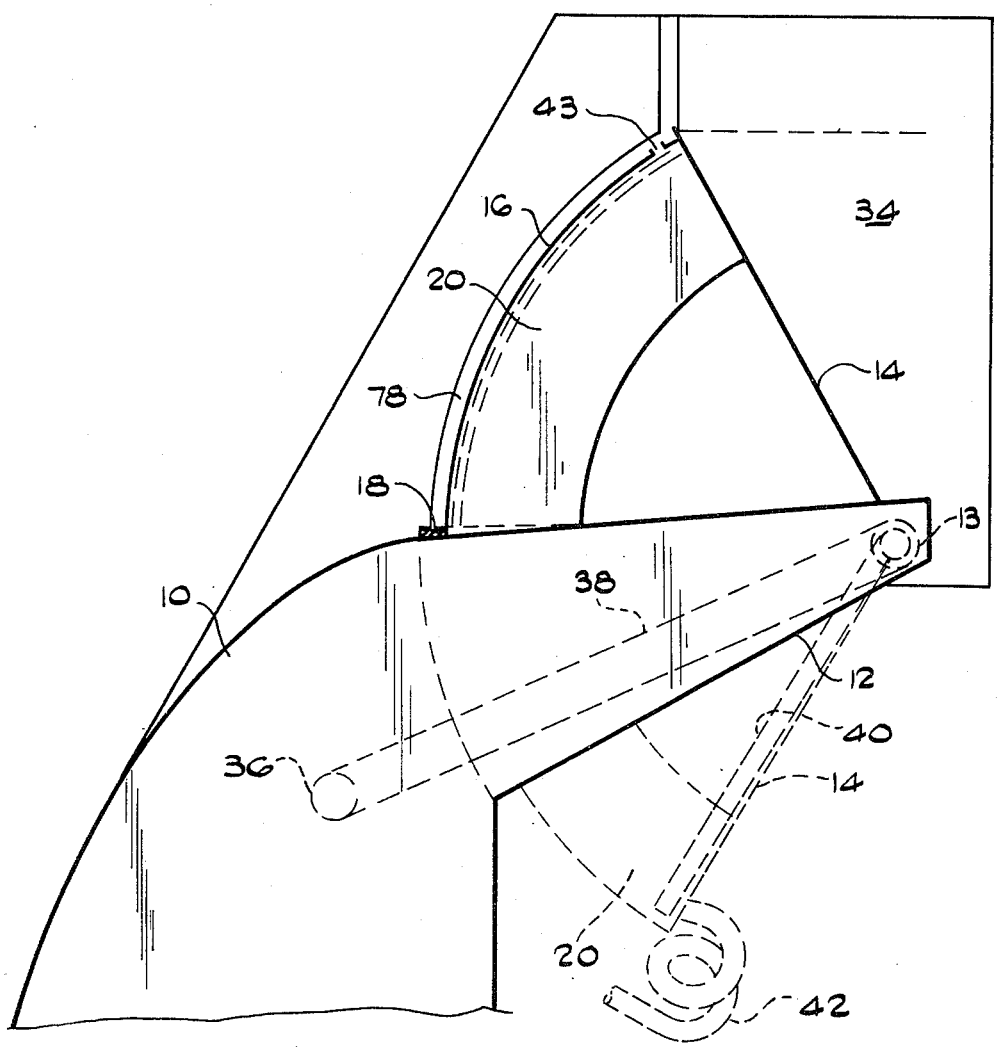

This invention relates to gate valve means for controlling the flow of water over the crest of a water-impounding barrier such as a weir, dam wall or the like.

An object of the invention is to provide gate valve means which, besides being adjustable for controlling the volume of the flow over the crest, is capable of being readily removed when not required.

According to the invention gate valve means for controlling the flow of water, over the crest of the impounding wall of a weir, dam or the equivalent, includes at least one variable buoyancy sector-shaped gate valve which is pivotally mounted at its apex end by supporting means provided on the impounding wall, so that its free end is capable of being floatably supported by the water impounded by the wall, wherein a curved surface of the gate valve, positioned at a suitable distance from its pivoting axis, is arranged to co-operate with sealing means conveniently fixed to the crest of the wall whereby, in a raised floating position, the gate valve extends the effective height of the impounding wall and thereby increases the storage volume of the impounded body of water behind the impounding wall, and wherein the gate valve is provided with at least one buoyancy chamber which is connectible to control apparatus arranged to project water into or withdraw water from such buoyancy chamber to vary the buoyancy of the gate valve itself, and thereby to vary the extent by which it projects above the crest of the impounding wall. The sealing means is conveniently fixed along the upstream edge of the crest of the wall and may be in the form of a strip of resilient material such as rubber or a suitable plastic. Further sealing means are provided on the side walls located at each end of the gate valve, between which it operates.

The sector-shaped gate valve employed is of the kind having at least one buoyancy chamber, which is connectable to control apparatus arranged to admit water to or withdraw water from such buoyancy chamber for purposes of varying the buoyancy of the gate valve as a whole. The control apparatus may include syphon means. Alternatively, particularly in the case of very large gate valves, mechanical pump means may be used as the control apparatus.

It is to be understood that at least the buoyancy chamber is located on the upstream side of the impounding wall where it will be floatable in the impounded water adjacent the impounding wall.

To enable the invention to be more clearly understood, reference is now made to the accompanying drawings in which:

FIG. 1 is a diagrammatic end sectional view showing a gate valve mounted on the impounding wall of a weir or dam according to the invention, FIG. 2 is a view similar to that of FIG. 1, showing a modified arrangement of the gate valve, also according to the invention, FIG. 3 is a fragmentary view partly diagrammatic showing an arrangement of gate valves of the kind shown in FIG. 1, where two or more are required to be mounted in endwise relationship to span the top of a relatively long impounding wall, and FIG. 4 is a fragmentary sectional view of the sealing means between the side of a gate valve and a side wall.

Referring to FIG. 1 of the drawings, reference 10 denotes the top or crest part of the concrete impounding wall of a weir or dam, which is provided with a pair of spaced cantilever arms 12 projecting from its upstream side, pivotally located between the two arms 12 by its apex end and a pivot shaft 13, is a variable buoyancy sector gate valve 14 arranged so that its free outer curved end face 16 co-operates sealingly with a sealing member 18 fixed along the crest of the wall, and so that the two ends of the gate valve 14 also seal against spaced side walls 34. The gate valve 14 is shown in its fully raised position by the full line outline, and in its fully lowered position by the dotted outline in which its top side is level with the crest of the wall. Reference 20 denotes the buoyancy chamber into and from which water is arranged to be moved to control it floating position with regard to the crest of the wall. In a modified construction the arms 12 may extend upwardly from a lower region of the wall so that they approach an upright disposition.

The buoyancy chamber 20 is connected to control apparatus via a conduit 36 in the wall 10, a conduit 38 in the arm 12, and the bore of a hollow pivot shaft 13 and through a radial conduit 40 extending into the lower region of the buoyancy chamber 20 from the hollow pivot shaft 13.

In small installations the buoyancy chamber 20 may be connected to control apparatus by means of a flexible hose 42. An air inlet and outlet opening 43 is provided at the highest region of the buoyancy chamber 20, to permit free filling and emptying thereof.

FIG. 2 illustrates an alternative arrangement and construction for the apparatus of the invention. In this case the gate valve 22 comprises a front end part which includes the buoyancy chamber 24 which has one or more hollow radial support arms 26 extending from its upper side only and connected to a suitable boss to provide a bearing for a hollow shaft 28, supported on a pair of cantilever arms 29, extending in a downstream direction. In end view the gate valve 22 is substantially of L-shape. For sealing purposes an inside curved surface 23 of the limb carrying the buoyancy chamber 24, is arranged to coact with a sealing strip 25 fixed to the upstream side of the crest of the impounding wall 30. The two ends of the gate valve 22 co-act with sealing devices fixed to side walls similar to those of FIGS. 3 and 4.

Water from control apparatus is arranged to be admitted to and withdrawn from the buoyancy chamber 24 by way of conduit 45 embedded in the wall 30, and branch conduit 46 leading to the hollow pivot shaft 28. Also connected to the hollow pivot shaft 28 is a conduit 48 extending through one of the hollow support arms 26 and into the lower region of the buoyancy chamber 24. An air inlet and outlet opening 49 is provided at the highest region of the buoyancy chamber 24, to permit free filling and emptying thereof.

The gate valve 22 as represented by full line is shown in its fully raised position, while the dotted outline of it shows its position when fully lowered. The overflow crest of the gate valve is indicated by the curved dotted line 32.

Reference is now made to FIGS. 3 and 4 of the drawings which illustrate an installation in which two or more gate valves 14a are located along the crest of an impounding dam or weir wall 50 between spaced partitioning side walls 34a, built onto the wall 50.

The ends of each gate valve 14a are shown pivotally supported from a side wall 34a by means of a short tubular pivot shaft 52 which is connected to a conduit 54 embedded in the wall 50 and the side wall 34a, and connected to control apparatus (not shown). The gate valve end is mounted on the hollow pivot shaft 52 by two arms 56 and 58. The arm 58 is hollow and acts as a water conveying conduit communicating with the interior of the buoyancy chamber 20a. When the gate valves 14a are of the elongated form shown, they are supported intermediately of their ends by a pair of arms 60 and 62 and a pivot bearing 64 supported on a concrete bracket 66.

FIG. 4 illustrates a method of constructing the sealing means between the end of a gate valve and a side, end or partitioning wall such as 34 or 34a. Although in this figure the references 34a and 14a are used from FIG. 3, the construction also applies to the gate valves of FIGS. 1 and 2.

The sealing means comprises an arcuate supporting bracket 70 fixed to the wall 34a, for an arcuate resilient sealing strip 72 made from rubber or a suitable plastic with which a sealing bead 74, likewise secured to or formed integrally with an arcuate bracket 76, cooperates sealingly. An arcuate ventilation slot 78 is provided on the side of the wall 34a and is also shown on the wall 34 in FIG. 1. This ventilation slot is provided for the purpose of allowing air at atmospheric pressure to reach the underside of the top tip of the gate valve. This is necessary to promote a steady flow over the gate when raised and to ensure that the passage of air to and from the air inlet and outlet opening 43 (or 49 in FIG. 2) does not become obstructed.

Under certain conditions it may be necessary to provide a special air vent which passes through one of the axis arms and is carried to an elevation greater than that of the highest possible flood level.

What is claimed is:
1. Water flow controlling structure comprising:
 (i) a barrier for impounding water,
 (ii) side walls projecting above the level of the crest of the barrier,
 (iii) a gate valve positioned between the side walls for controlling flow of water over the crest of the barrier, the gate valve incorporating at least one buoyancy chamber,
 (iv) mounting means for mounting the gate valve so that it floats on the water impounded by the barrier and is free to move through an operating range having as one useful end limit a position in which an upper edge of the valve is substantially flush with the crest of the barrier and as its other useful end limit a position in which a lower edge of the valve is substantially flush with said crest,
 (v) sealing means between the barrier and the gate valve and effective over the entire useful operating range of the gate valve to prevent flow of water between said valve and barrier,
 (vi) further sealing means between said valve and said side walls to prevent flow of water therebetween over the entire useful operating range of the valve, and
 (vii) control apparatus for projecting water into, and withdrawing water from, said buoyancy chamber to vary the buoyancy of the gate valve and thereby vary the extent by which the gate valve projects above the crest of the barrier.

2. Water flow controlling structure comprising:
 (i) a barrier for impounding water,
 (ii) side walls projecting above the level of the crest of the barrier,
 (iii) a gate valve positioned between the side walls for controlling flow of water over the crest of the barrier, the gate valve being sector-shaped and incorporating at least one buoyancy chamber,
 (iv) mounting means for pivotally mounting the apex end of the gate valve so that its free end floats on the water impounded by the barrier and is free to move through an operating range having as one useful end limit a position in which an upper edge of the valve is substantially flush with the crest of the barrier and as its other useful end limit a position in which a lower edge of the valve is substantially flush with said crest,
 (v) sealing means between the barrier and the gate valve and effective over the entire useful operating range of the gate valve to prevent flow of water between said valve and barrier,
 (vi) further sealing means between said valve and said side walls to prevent flow of water therebetween over the entire useful operating range of the valve, and
 (vii) control apparatus for projecting water into, and withdrawing water from, said buoyancy chamber to vary the buoyancy of the gate valve and thereby vary the extent by which the gate valve projects above the crest of the barrier.

References Cited

UNITED STATES PATENTS

| 1,797,661 | 3/1931 | Huguenin | 61—25 |
| 2,207,479 | 7/1940 | Danel | 61—25 |
| 2,984,986 | 5/1961 | Hill | 61—28 |
| 2,317,975 | 5/1943 | Boath et al. | 61—25 |
| 3,221,504 | 12/1965 | Turner | 61—22 |

FOREIGN PATENTS

| 1,192,472 | 4/1959 | France. |
| 1,272,155 | 8/1961 | France. |

JACOB SHAPIRO, Primary Examiner

U.S. Cl. X.R.

61—26, 27